July 14, 1931. J. H. WAGENHORST 1,814,198
VEHICLE WHEEL
Filed April 30, 1928
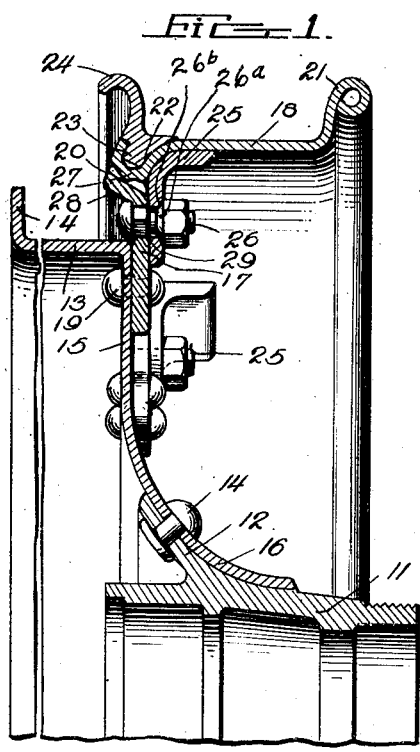
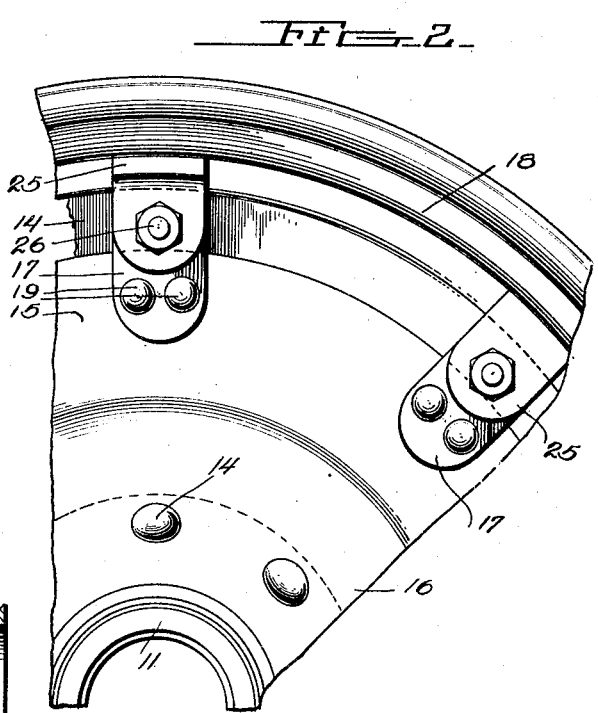
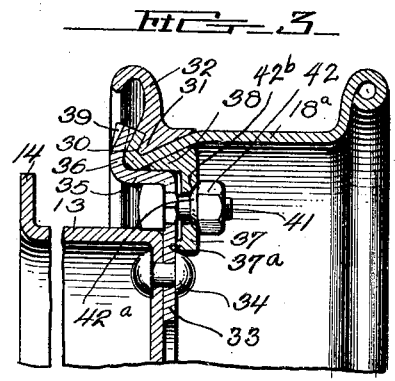
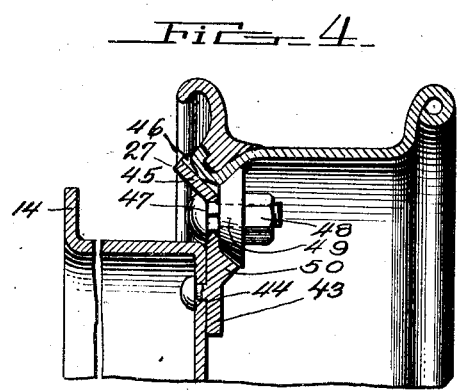
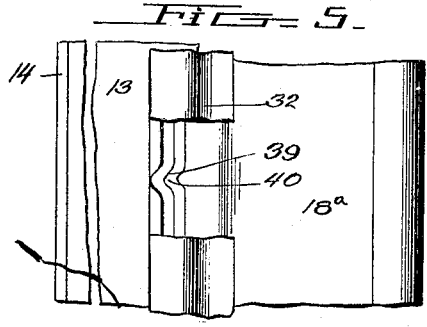
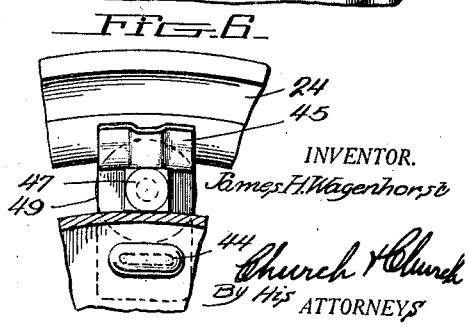
INVENTOR.
James H. Wagenhorst
Church & Church
BY HIS ATTORNEYS Patented July 14, 1931

1,814,198

UNITED STATES PATENT OFFICE

JAMES H. WAGENHORST, OF JACKSON, MICHIGAN

VEHICLE WHEEL

Application filed April 30, 1928. Serial No. 273,953.

This invention relates to vehicle wheels, particularly to automobile wheels embodying a brake drum and a demountable tire-carrying rim. One of the objects of the invention is the provision of a light, rugged wheel which can be economically manufactured and will be efficient in withstanding the strains to which such wheels are subjected. Another object is the provision of a wheel of this type in which the strains incident to braking will be reduced, and a still further object is the provision of such a wheel in which the tire-carrying rim will be positively clamped and driven but may be readily put on or removed. Still further objects and the novel features characterizing the invention will be apparent from the following specification when read in conjunction with the accompanying drawings, in which:—

Fig. 1 is a fragmentary view in radial transverse section of a wheel embodying the invention;

Fig. 2 is a fragmentary view in side elevation of the wheel shown in Fig. 1;

Figs. 3 and 4 are fragmentary sectional views, similar to Fig. 1, but showing modified forms of the invention;

Fig. 5 is a fragmentary plan view of the structure shown in Fig. 3; and

Fig. 6 is a fragmentary view in side elevation of the structure shown in Fig. 4.

In all of the modifications shown a wheel is formed by mounting a brake drum upon a hub, and rigidly securing to the brake drum, adjacent its periphery, suitable means for demountably supporting the tire-carrying rim. As shown in Figs. 1 and 2, a hub 11, of any desired construction, is provided with an integral annular flange 12 having a concave outer surface, and to this flange a brake drum 13 is rigidly and permanently secured by rivets 14, or in any other suitable manner. The brake drum 13 has the usual cylindrical portion, presenting the braking surface, and may have a reinforcing flange 14, if desired, the body portion of the drum being flat adjacent the peripheral cylindrical portion, as shown at 15, and being curved adjacent its center, as shown at 16, to nest against the concave surface of the hub flange 12.

In the structure shown in Figs. 1 and 2, a series of radially disposed support members 17 are provided to act as a support for a tire-carrying rim 18, such members being circumferentially spaced and of any desired number, and being rigidly secured to the flat portion 15 of the brake drum adjacent to its periphery by rivets 19, or in any other suitable manner. The outer ends of the members 17 are bent back slightly over the brake drum, the bent portion 20 of each member forming an angle of approximately thirty degrees with the axis of the wheel. It will be evident that the bent portions 20, taken together, constitute a conical rim-supporting surface, presenting circumferentially spaced surfaces having the same slope and all lying in the same frusto-conical surface. The rim 18 is of the "quick detachable" type having at one edge an integral tire-retaining side flange 21 and at its other edge formed with a channel 22 to receive the base portion 23 of a detachable side ring 24, which constitutes the other tire-retaining flange. The bottom wall of the channel 22 has the same slope as the bent portions 20 of the support members 17, and clamps 25 are provided to hold the rim 18 seated against the support members, such clamps being curved to fit the inner surface of the rim and the adjacent wall of the side channel, and having flat portions engaging the support members 17 and detachably secured thereto by bolts 26, which are preferably formed with conical end portions 26ª to engage in conical countersunk openings 26ᵇ in the clamps 25.

In order to prevent relative circumferential movement between the rim 18 and the support members 17, rib-like projections 27 are formed on the rim by depressing the bottom wall of the channel 22, and a groove 28 is formed in the bent seat portion 20 of each of the support members 17, of suitable size and shape to receive and fit such projections 27. The bolts 26 are preferably squared adjacent their heads and the corners of the squared portions are peened down against the outer side of their members 17 at 29 and are thus secured in place. If desired, the bolts 26 may be further secured in place by welding or any other suitable means.

In the modification shown in Figs. 3 and 5, the rim 18$^a$ has a side channel 30 of slightly different cross-sectional shape to receive the base 31 of the detachable side ring 32. The rim is supported upon a continuous ring 33 which is secured to the brake drum 13 by rivets 34 and is bent back over the brake drum to form a seating portion 35 and then outwardly to form a flange portion 36. The rim 18$^a$ is clamped against the flange portion 36 by a series of circumferentially spaced clamps 37 each of which has a flat body portion and a fulcrum lip 37$^a$ at its innermost edge, to engage the continuous ring 33 and a wedge-shaped laterally projecting portion 38 at its outer end to engage the under side of the rim and the outer side of the seating portion 35 of the ring 30. Interlocking of the continuous ring 30 and the rim to prevent relative circumferential movement is effected by bending out the flange 36 opposite the center of the clamps 37 to form recesses 39, and similarly bending the side wall of the channel of the rim to form projections 40 which fit in such recesses, as shown in Fig. 5.

The bolts 41, for securing the clamps 37, preferably have squared heads which fit between the brake drum 13 and the underside of the seating portion 35 to enhance the rigidity of the structure, and may be formed with squared portions adjacent the heads and secured in place as described with reference to the bolts 26 of Fig. 1. Nuts 42 on the bolts 41, are preferably formed with conical end portions 42$^a$ to engage in countersunk recesses 42$^b$ in the clamps 37, and the openings in the clamps 37 through which the bolts pass are slightly larger than the bolts to permit slight radial movement.

In Figs. 4 and 6 there is illustrated a modified structure for supporting the rim on the brake drum. Each of the support members 43 is secured to the brake drum near its periphery by an elongated integral rivet portion 44 which is upset against the inner face of the drum. The outer end of each member 43 is bent laterally to form a seating portion 45, similar to the portion 20 of member 17 in Fig. 1, and is provided with a groove 46 to receive the driving projection 27 of the rim. A bolt 47 is secured in any desired manner, to the support member 43 and receives a nut 48 which has an integral frusto-conical portion 49 fitting between the sloping bottom wall of the rim 18 and a projection 50 formed on the member 43.

In all of the modifications shown, it will be apparent that a rugged support is provided for the rim and a considerable saving is effected in weight, and in the cost of construction. The braking strains will be transmitted from the brake drum directly to the hub and through the supporting members to the rim. The vertical load strains will be transmitted from the rim, through the support members 17 or 43 or the supporting ring 33, to the hub substantially in the plane of the flat portion 15 of the brake drum, so that any tendency to loosen the rivets, or other securing means, or to distort the parts, is reduced to a minimum.

It will be understood that the invention is in no way limited to the use of "quick-detachable" rims, and that rims of any type may be utilized and similarly supported on the brake drum. Likewise the shape of the support members 17, 33 or 43 may be altered to secure any desired relative axial position of the rim and the brake drum.

By the use of the spaced support members an air gap is provided between the brake drum and the rim which will practically prevent transfer of heat between them, and a circulation of air currents will be effected which will cool both the brake drum and the rim and tire.

These modifications have been presented as illustrating various forms in which the invention may be practically employed, but it will be understood that the invention is not limited thereto and that changes may be made in the details of construction within the scope of the following claims.

What I claim is:

1. A wheel comprising the combination of a hub, a brakedrum mounted thereon, a plurality of rim supporting members rigidly secured to the brakedrum, a demountable rim having an inwardly extending gutter at one edge thereof, said gutter being seated on said rim supporting members and rim securing members detachably fastened to said rim supporting members and engaging the front face of said gutter to hold it seated upon said rim supporting members.

2. A wheel comprising the combination of a hub, a brakedrum secured thereto, a plurality of rim supporting members having rearwardly inclined seats, a demountable rim having an inwardly extending gutter adjacent the rear edge thereof seated upon said inclined seats, and rim securing members detachably fastened to the rim supporting members and engaging the front face of said gutter to hold it in position upon said seat.

3. A wheel comprising the combination of a hub, a brakedrum, a plurality of rim supporting members rigidly secured to said brakedrum, a demountable rim having an inwardly extending gutter at one edge thereof seated upon said rim supporting members, said members and gutter having interengaging portions rigidly anchoring the outer end of each supporting member in proper circumferential position on the rim, and rim securing devices detachably secured to said members and engaging the front face of the gutter for holding the rim seated upon the rim supporting members.

4. A wheel having no felloe comprising, a hub member, a plurality of spoke members radiating from said hub member, a demountable tire rim having an inwardly extending annular rib one side of which bears against the outer ends of the spoke members, means on said spoke ends interlocking with means on the contiguous portions of said rib for rigidly anchoring each spoke end in proper circumferential position on the rim, bolts anchored to said spoke members adjacent their outer ends, and means carried by said bolts bearing upon the other side of said rib, forcing the coacting means on the spoke ends and rib into engagement, and maintaining said rim mounted upon said spoke members in wheel form.

JAMES H. WAGENHORST.